(12) United States Patent
Murata

(10) Patent No.: US 9,873,343 B2
(45) Date of Patent: Jan. 23, 2018

(54) POWER STORAGE SYSTEM AND TEMPERATURE CONTROL METHOD FOR THE SAME

(71) Applicant: Takashi Murata, Kasugai (JP)

(72) Inventor: Takashi Murata, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 220 days.

(21) Appl. No.: 14/408,869

(22) PCT Filed: Aug. 14, 2013

(86) PCT No.: PCT/IB2013/001778
§ 371 (c)(1),
(2) Date: Dec. 17, 2014

(87) PCT Pub. No.: WO2014/033517
PCT Pub. Date: Mar. 6, 2014

(65) Prior Publication Data
US 2015/0321577 A1 Nov. 12, 2015

(30) Foreign Application Priority Data
Aug. 29, 2012 (JP) ................................ 2012-188877

(51) Int. Cl.
*B60L 11/18* (2006.01)
*H02J 7/00* (2006.01)
(Continued)

(52) U.S. Cl.
CPC ............. *B60L 11/1816* (2013.01); *B60L 7/14* (2013.01); *B60L 11/1803* (2013.01); *B60L 11/1861* (2013.01); *B60L 11/1872* (2013.01); *B60L 11/1875* (2013.01); *H01M 10/425* (2013.01); *H01M 10/443* (2013.01); *H02J 7/007* (2013.01); *H02J 7/1438* (2013.01);
(Continued)

(58) Field of Classification Search
CPC ...................................................... H02J 7/007
USPC ........................................................ 320/153
See application file for complete search history.

(56) References Cited

U.S. PATENT DOCUMENTS 6,518,726 B1* 2/2003 Nowlin, Jr. ........... H02J 7/0026
320/128
2009/0256523 A1 10/2009 Taguchi
(Continued)

FOREIGN PATENT DOCUMENTS

CN 102473976 A 5/2012
EP 2538531 A1 12/2012
(Continued)

*Primary Examiner* — Thuan Do
(74) *Attorney, Agent, or Firm* — Oliff PLC

(57) ABSTRACT

A power storage system having a power storage device configured to be charged and discharged, a boost circuit and a controller, and a method of controlling the temperature of the power storage device are provided. The boost circuit includes a reactor and switching devices, and boosts the output voltage of the power storage device when the switching devices are driven. The controller alternately performs a charging operation to supply electric power from an external power supply to the power storage device, and a temperature elevating operation to warm up the power storage device, using ripple current generated when the switching devices are driven.

11 Claims, 5 Drawing Sheets

(51) Int. Cl.
  *H01M 10/42* (2006.01)
  *H01M 10/44* (2006.01)
  *B60L 7/14* (2006.01)
  *H02J 7/14* (2006.01)

(52) U.S. Cl.
  CPC ............. *B60L 2240/545* (2013.01); *H01M 2010/4271* (2013.01); *H01M 2220/20* (2013.01); *Y02T 10/705* (2013.01); *Y02T 10/7005* (2013.01); *Y02T 10/7044* (2013.01); *Y02T 10/7072* (2013.01); *Y02T 90/14* (2013.01)

(56) References Cited

U.S. PATENT DOCUMENTS

| | | |
|---|---|---|
| 2010/0270976 A1 | 10/2010 | Tamura |
| 2010/0277128 A1 | 11/2010 | Tam et al. |
| 2012/0021263 A1 | 1/2012 | Nishi et al. |
| 2012/0300523 A1 | 11/2012 | Sugiyama et al. |
| 2015/0048796 A1* | 2/2015 | Sherstyuk ........... H01M 10/425 320/129 |

FOREIGN PATENT DOCUMENTS

| | | |
|---|---|---|
| JP | H07142095 A | 6/1995 |
| JP | 2004242379 A | 8/2004 |
| JP | 2008-092624 A | 4/2008 |
| JP | 2010119171 A | 5/2010 |
| JP | 2010220305 A | 9/2010 |
| JP | 2010257722 A | 11/2010 |
| JP | 2011015544 A | 1/2011 |
| JP | 2011083124 A | 4/2011 |
| WO | 2011004250 A2 | 1/2011 |
| WO | 2011004464 A1 | 1/2011 |
| WO | 2011101959 A1 | 8/2011 |

* cited by examiner

POWER STORAGE SYSTEM AND TEMPERATURE CONTROL METHOD FOR THE SAME

BACKGROUND OF THE INVENTION

1. Field of the Invention

The invention relates to a technology of elevating the temperature of a power storage device, using ripple current.

2. Description of Related Art

It is known that, as the temperature of a secondary battery decreases, the internal resistance of the secondary battery increases, and the output of the secondary battery is reduced. If the secondary battery is warmed up, the internal resistance of the secondary battery can be reduced, and sufficient power can be generated by the secondary battery. Technologies concerning the temperature of the secondary battery are described in, for example, Japanese Patent Application Publication No. 2008-092624 (JP 2008-092624 A), Japanese Patent Application Publication No. 2011-015544 (JP 2011-015544 A), Japanese Patent Application Publication No. 2010-257722 (JP 2010-25722 A), and Japanese Patent Application Publication No. 07-142095 (JP 07-142095 A).

The secondary battery may be charged with electric power supplied from another power supply. When the secondary battery is charged in this manner, the secondary battery may have to be warmed up. In this case, it is preferable to perform charging of the secondary battery and warming of the secondary battery with high efficiency.

SUMMARY OF THE INVENTION

According to one aspect of the invention, a power storage system having a power storage device configured to be charged and discharged, a boost circuit, and a controller is provided. The boost circuit includes a reactor and switching devices, and is configured to boost an output voltage of the power storage device when the switching devices are driven. The controller is configured to alternately perform a charging operation and a temperature elevating operation. The charging operation supplies electric power from an external power supply to the power storage device, and the temperature elevating operation warms up the power storage device by using ripple current generated when the switching devices are driven.

In the power storage system as described above, the charging operation and the temperature elevating operation are alternately performed. In the temperature elevating operation, ripple current flows through the reactor, so that the reactor generates heat. The temperature elevating operation is not performed while the charging operation is performed; therefore, even if the temperature of the reactor is increased through the temperature elevating operation, the temperature of the reactor can be reduced by releasing heat from the reactor while the charging operation is performed. Thus, the reactor is prevented from excessively generating heat.

In order to curb excessive heat generation by the reactor, it may be considered to increase the cross-sectional area of a coil wire of the reactor, and thus increase the heat capacity of the reactor. However, in this case, the size of the reactor is increased as the cross-sectional area of the coil wire is increased. In the power storage system as described above, the charging operation and the temperature elevating operation are alternately performed, so that the reactor is prevented from excessively generating heat; therefore, the reactor need not be large-sized.

On the other hand, the charging operation is not performed while the temperature elevating operation is performed; therefore, ripple current used in the temperature elevating operation can be prevented from flowing toward the external power supply. Namely, on the side of the external power supply, noise is prevented from occurring due to the ripple current. Thus, in the power storage system as described above, when the power storage device is charged, and the power storage device is warmed up, the charging operation and the temperature elevating operation can be performed with high efficiency.

In the power storage system as described above, ripple current can be produced by using the boost circuit, which makes it unnecessary to provide a component dedicated to producing ripple current. Namely, according to the power storage system as described above, the number of components is prevented from increasing.

In the power storage system as described above, the controller may switch from the temperature elevating operation to the charging operation when the temperature of the reactor becomes higher than an upper-limit temperature. The temperature of the reactor may be detected using a first temperature sensor. The upper-limit temperature may be set, as appropriate, based on the heatproof temperature of the reactor.

By switching the system from the temperature elevating operation to the charging operation, in response to a determination that the temperature of the reactor reaches the upper-limit temperature, it is possible to inhibit current from passing through the reactor via the temperature elevating operation. The controller may switch the system from the temperature elevating operation to the charging operation, when a predetermined period of time elapses from the time when the temperature elevating operation is started. Through switching between the temperature elevating operation and the charging operation, the increase of the temperature of the reactor can be limited. Namely, the temperature of the reactor is prevented from increasing excessively, so that the reactor can be protected.

Also, the controller may switch the system from the charging operation to the temperature elevating operation when the reactor temperature becomes lower than a lower-limit temperature. The controller may switch the system from the charging operation to the temperature elevating operation when a predetermined period of time elapses from the time when the temperature elevating operation is stopped. Here, the lower-limit temperature may be set to a temperature at which the rate of reduction of the reactor temperature following the stop of the temperature elevating operation becomes equal to or smaller than a threshold value. Namely, the reactor temperature at which the rate of reduction of the reactor temperature becomes less likely or unlikely to change may be set as the lower-limit temperature. Also, an ambient temperature measured around the reactor may be set as the lower-limit temperature.

By switching the system from the charging operation to the temperature elevating operation, in response to a determination that the temperature of the reactor reaches the lower-limit temperature, it is possible to start the temperature elevating operation in a condition where the temperature of the reactor has been sufficiently reduced, thus making it easier to ensure a sufficient period of time for the temperature elevating operation. When the temperature elevating operation is performed, ripple current flows through the reactor, so that the temperature of the reactor is increased. If the temperature of the reactor is sufficiently reduced when the temperature elevating operation is started, a sufficient amount of increase in the temperature of the reactor through the temperature elevating operation can be easily ensured, and a sufficient amount of time for performing the temperature elevating operation can be easily ensured.

In the power storage system as described above, the controller may alternately perform the charging operation and the temperature elevating operation, until the temperature of the power storage device reaches a predetermined temperature. With this arrangement, the power storage device is warmed up, so that the power storage device can easily receive and generate a sufficient amount of electric power. The temperature of the power storage device may be detected using a second temperature sensor.

The controller may continue the charging operation without performing the temperature elevating operation when the temperature of the power storage device becomes higher than the predetermined temperature. When the temperature of the power storage device is higher than the predetermined temperature, the power storage device can surely receive and generate a sufficient amount of power. If the charging operation is continued in this condition, the voltage of the power storage device can be increased up to a set voltage (e.g., a voltage corresponding to the fully charged state) to be established by charging.

The power storage device may generate electric energy that is to be converted into kinetic energy for running the vehicle. When the power storage device is installed on the vehicle, electric energy generated from the power storage device is converted into kinetic energy, so that the vehicle runs using the kinetic energy.

According to another aspect of the invention, a temperature control method for a power storage system including a power storage device configured to be charged and discharged, and a boost circuit including a reactor and switching devices and configured to boost an output voltage of the power storage device when the switching devices are driven, is provided. The temperature control method includes the steps of: executing a charging operation to supply electric power from an external power supply to the power storage device, executing a temperature elevating operation to produce ripple current by driving the switching devices, and warm up the power storage device by using the ripple current, and alternately executing the charging operation and the temperature elevating operation. With the temperature control method for the power storage system as described above, substantially the same effect as that of the power storage system as described above can be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
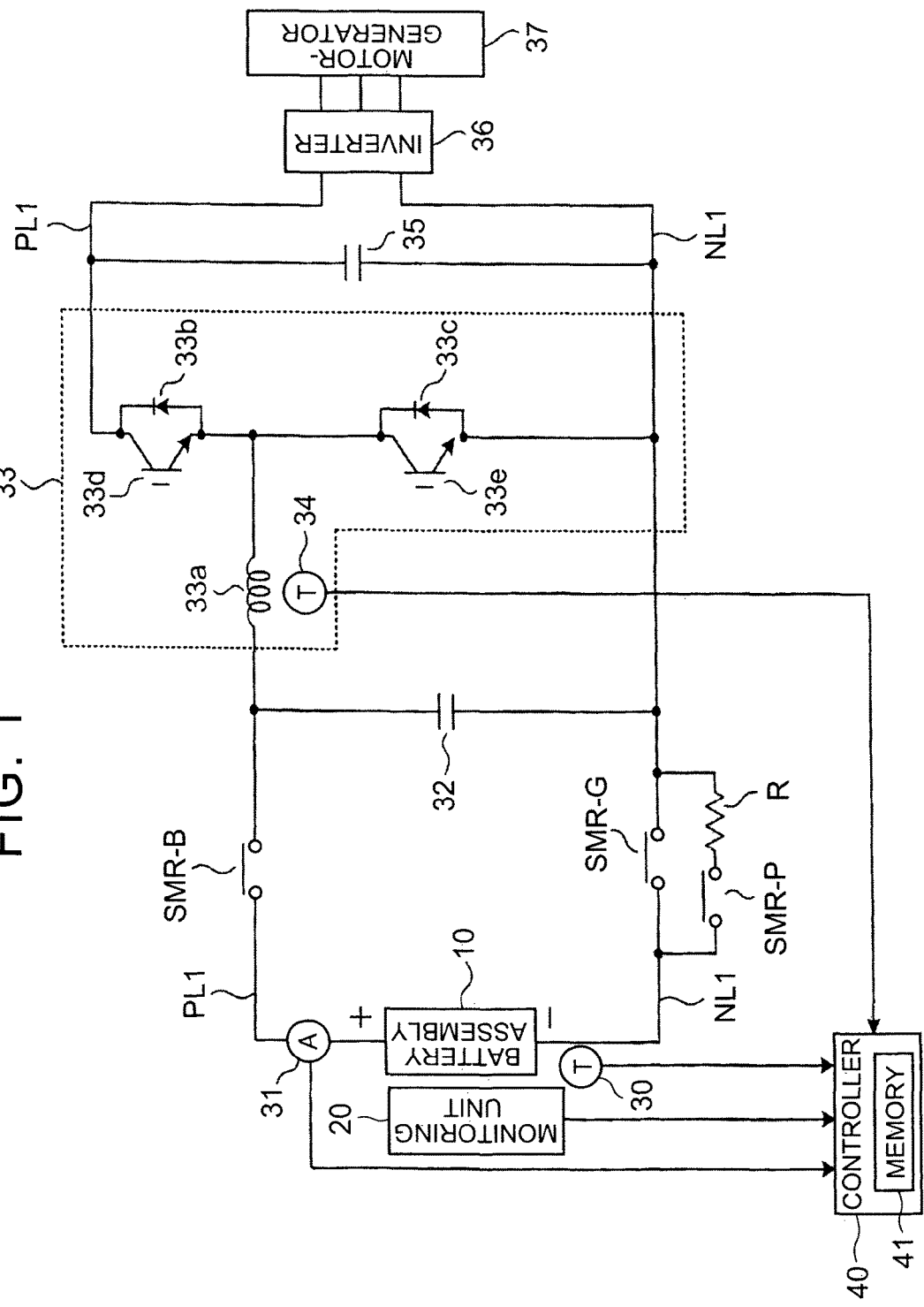
FIG. 1 is a view showing the configuration of a battery system according to one embodiment of the invention.

One embodiment of the invention will be described. A battery system (corresponding to the power storage system) as one embodiment of the invention will be described with reference to FIG. 1. FIG. 1 shows the configuration of the battery system. The battery system of this embodiment may be installed on a vehicle. As will be described later, the present invention may be applied to any type of battery system provided that it has a boost circuit that boosts the output voltage of a battery, and a system capable of charging the battery using electric power of an external power supply.

The vehicle may be a hybrid vehicle or an electric vehicle, for example. The hybrid vehicle includes a battery assembly that will be described later, and another power source, such as an engine or a fuel cell, as power sources for running the vehicle. The electric vehicle includes only the battery assembly that will be described later, as a power source for running the vehicle. As will be described later, the battery assembly is charged with electric power supplied from an external power supply. Charging of the battery assembly using electric power from the external power supply will be called "external charging operation".

The battery assembly (corresponding to the power storage device) 10 has a plurality of cells connected in series. A secondary battery, such as a nickel-metal-hydride battery or a lithium-ion battery, may be used as each of the cells. Also, an electric double layer capacitor may be used instead of the secondary battery. The number of cells that constitute the battery assembly 10 may be set as appropriate, in view of power required to be generated from the battery assembly 10, for example. The battery assembly 10 may include a plurality of cells that are connected in parallel.

A monitoring unit 20 detects the voltage between the terminals of the battery assembly 10, or detects the voltage between the terminals of each cell, and outputs the detection result to a controller 40. The controller 40 uses the voltage detected by the monitoring unit 20 when it controls charge and discharge of the battery assembly 10. When an external charging operation is performed, the voltage of the battery assembly 10 or cell may be monitored, based on the output of the monitoring unit 20.

A temperature sensor 30 detects the temperature of the battery assembly 10, and outputs the detection result to the controller 40. The number of temperature sensors 30 may be set as appropriate. When two or more temperature sensors 30 are used, the temperature sensors 30 may be disposed at mutually different positions, relative to the battery assembly 10. The temperature(s) detected by the temperature sensor(s) 30 may be used when charge and discharge of the battery assembly 10 are controlled.

As the temperature of the battery assembly 10 (cell) decreases, the internal resistance of the battery assembly 10 (cell) increases, and the battery assembly 10 is less likely to receive and generate a sufficient amount of power. If the battery assembly 10 is warmed up, on the other hand, the internal resistance of the battery assembly 10 (cell) can be reduced, and the battery assembly 10 is able to receive and generate a sufficient amount of power.

In this connection, the output power of the battery assembly 10 needs to be higher than electric power (starting power) required to start the vehicle, for example. When the output power of the battery assembly 10 is lower than the starting power, due to reduction of the temperature of the battery assembly 10, the battery assembly 10 is warmed up, so that the output power of the battery assembly 10 becomes higher than the starting power.

If the temperature of the battery assembly 10 is detected by use of the temperature sensor 30, it can be determined whether the temperature of the battery assembly 10 is reduced. If the temperature of the battery assembly 10 is reduced, the battery assembly 10 is warmed up in the manner as will be described later, so that the battery assembly 10 is more likely to receive and generate a sufficient amount of power.

A current sensor 31 detects a value of current flowing through the battery assembly 10, and outputs the detection result to the controller 40. In this embodiment, when the battery assembly 10 discharges, a positive value can be used as the current value detected by the current sensor 31. Also, when the battery assembly 10 is charged, a negative value can be used as the current value detected by the current sensor 31.

In this embodiment, the current sensor 31 is provided in a positive line PL1 connected to a positive terminal of the battery assembly 10. However, the location of the current sensor 31 is not limited to that of this embodiment, but may be selected as desired provided that the current sensor 31 is able to detect a value of current flowing through the battery assembly 10. More specifically, the current sensor 31 may be provided in at least one of the positive line PL1 and a negative line N1. Here, the negative line NL1 is a line connected to a negative terminal of the battery assembly 10.

A system main relay SMR-G is provided in the negative line NL1. The system main relay SMR-G switches between ON and OFF, in response to a control signal from the controller 40. A system main relay SMR-P and a current-limiting resistor R are connected in parallel with the system main relay SMR-G. The system main relay SMR-P and the current-limiting resistor R are connected in series.

The system main relay SMR-P switches between ON and OFF, in response to a control signal from the controller 40. The current-limiting resistor R is used for curbing flow of inrush current, when the battery assembly 10 is connected to a load (more specifically, a boost circuit 33 that will be described later).

A system main relay SMR-B is provided in the positive line PL1. The system main relay SMR-B switches between ON and OFF, in response to a control signal from the controller 40. A capacitor 32 is connected to the positive line PL1 and negative line NL1 located between the battery assembly 10 and the boost circuit 33. The capacitor 32 is used for smoothing the voltage between the positive line PL1 and the negative line NL1.

The boost circuit 33 boosts the output voltage of the battery assembly 10, and delivers the boosted power to an inverter 36. Also, the boost circuit 33 steps down the output voltage of the inverter 36, and delivers the stepped-down power to the battery assembly 10. The controller 40 is able to control the operation of the boost circuit 33.

The boost circuit 33 has a reactor 33a, diodes 33b, 33c, and transistors (npn type transistors) 33d, 33e as switching devices. The reactor 33a is connected at one end to the system main relay SMR-B, and is connected at the other end to a connecting point (intermediate point) of the transistors 33d, 33e.

The transistors 33d, 33e are connected in series, and a base of each of the transistors 33d, 33e receives a control signal (gate signal) from the controller 40. Each of the diodes 33b, 33c is connected between a collector and an emitter of a corresponding one of the transistors 33d, 33e, so that current flows from the emitter side to the collector side.

As the transistors 33d, 33e, IGBT (Insulated Gate Bipolar Transistor) may be used, for example. Also, switching devices, such as a power MOSFET (Metal Oxide Semiconductor Field-Effect Transistor), may be used, in place of the npn type transistors.

When the battery assembly 10 is connected with the boost circuit 33, the controller 40 initially switches the system main relay SMR-B to ON, and switches the system main relay SMR-P to ON. As a result, current can be passed through the current-limiting resistor R. Then, the controller 40 switches the system main relay SMR-G to ON, and then switches the system main relay SMR-P to OFF. In this manner, connection of the battery assembly 10 with the boost circuit 33 is completed, and the battery system as shown in FIG. 1 is brought into a startup status (Ready-On).

When the boost circuit 33 boosts the output voltage of the battery assembly 10, the controller 40 switches the transistor 33e to ON, and switches the transistor 33d to OFF. As a result, current flows from the battery assembly 10 to the reactor 33a, and magnetic field energy corresponding to the current amount is stored in the reactor 33a.

Then, the controller 40 switches the transistor 33e from ON to OFF, so that current flows from the reactor 33a to the inverter 36, via the diode 33b. As a result, the energy stored in the reactor 33a is released, so as to increase the output voltage of the battery assembly 10.

On the other hand, when the boost circuit 33 steps down or lowers the output voltage of the inverter 36, the controller 40 switches the transistor 33d to ON, and switches the transistor 33e to OFF. As a result, electric power is supplied from the inverter 36 to the battery assembly 10 via the reactor 33a, so as to charge the battery assembly 10.

A temperature sensor 34 detects the temperature of the reactor 33a, and outputs the detection result to the controller 40. When current flows through the reactor 33a, the reactor 33a generates heat, due to the resistance of the reactor 33a. The controller 40 is able to monitor the temperature of the reactor 33a, based on the output of the temperature sensor 34.

A capacitor 35 is connected between the lines PL1, NL1 located between the boost circuit 33 and the inverter 36. The capacitor 35 is used for smoothing the voltage between the positive line PL1 and the negative line NL1.

The inverter 36 converts DC power received from the boost circuit 33, to AC power, and delivers the AC power to a motor-generator 37. Also, the inverter 36 converts AC power generated by the motor-generator 37, to DC power, and delivers the DC power to the boost circuit 33. The controller 40 is able to control the operation of the inverter 36. As the motor-generator 37, a three-phase AC motor, for example, may be used.

The motor-generator 37 receives AC power from the inverter 36, and generates kinetic energy for running the vehicle. The kinetic energy generated by the motor-generator 37 is transmitted to the wheels, so as to run the vehicle.

When the vehicle is decelerated, or stopped, the motor-generator 37 converts kinetic energy generated during braking of the vehicle, to electric energy (AC power). The inverter 36 converts the AC power generated by the motor-generator 37, to DC power, and delivers the DC power to the boost circuit 33. The boost circuit 33 delivers the power from the inverter 36 to the battery assembly 10. In this manner, the regenerative power can be stored in the battery assembly 10.

The controller 40 incorporates a memory 41, and the memory 41 stores various information used when the controller 40 performs certain operations (in particular, operations which will be described in this embodiment). While the memory 41 is incorporated in the controller 40 in this embodiment, the memory 41 may be provided outside the controller 40.

Figure 2:
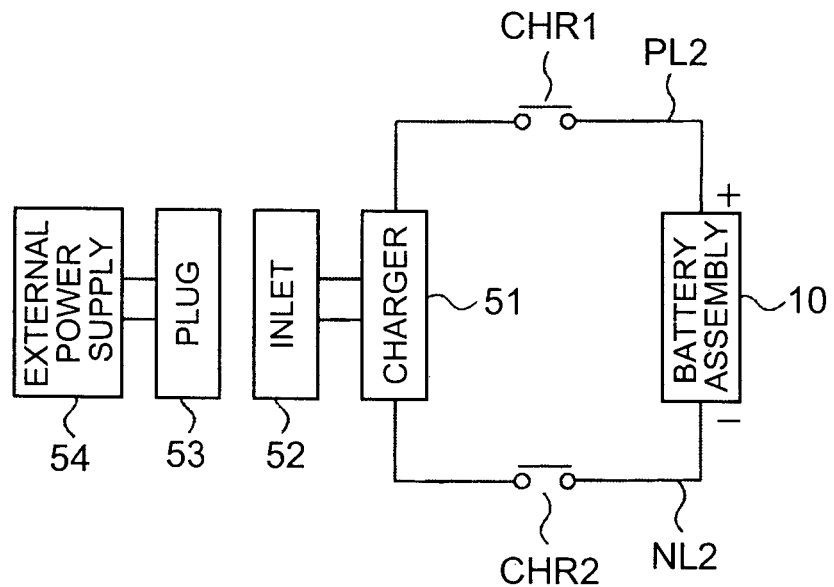
FIG. 2 is a view showing the configuration of an external charging system for charging the battery assembly shown in FIG. 1 with power from an external power supply.

Next, a system that performs an external charging operation will be described with reference to FIG. 2. The battery system of this embodiment includes the arrangement as shown in FIG. 2.

A positive line PL2 is connected to the positive terminal of the battery assembly 10, and a negative line NL2 is connected to the negative terminal of the battery assembly 10. A part of the positive line PL2 may also be used as a part of the positive line PL1 shown in FIG. 1. Also, a part of the negative line NL2 may also be used as a part of the negative line NL2 shown in FIG. 1.

A charging relay CHR1 is provided in the positive line PL2, and a charging relay CHR2 is provided in the negative line NL2. Each of the charging relays CHR1, CHR2 switches between ON and OFF, in response to a control signal from the controller 40.

A battery charger 51 is connected to the battery assembly 10, via the lines PL2, NL2. The charger 51 converts AC power supplied from an external power supply 54 that will be described later, to DC power, and supplies the DC power to the battery assembly 10. Thus, the battery assembly 10 can be charged, using the power from the external power supply 54. The charger 51 is also able to convert the voltage when it supplies the power from the external power supply 54 to the battery assembly 10.

An inlet 52 is connected to the charger 51, and the inlet 52 is connected to a plug 53. In this embodiment, the charger 51 and the inlet 52 are installed on the vehicle, and the plug 53 is placed outside the vehicle. The plug 53 is connected to the external power supply 54. In operation, the plug 53 is connected to the inlet 52, so that the power can be supplied from the external power supply 54 to the charger 51.

The external power supply 54 is a power supply installed separately from or independently of the vehicle, at a location outside the vehicle. The external power supply 54 may be a commercial power supply, for example. When the SOC (State of Charge) of the battery assembly 10 is reduced, due to running of the vehicle using the output of the battery assembly 10, the SOC of the battery assembly 10 can be increased by executing an external charging operation. In this connection, the SOC is the ratio of the current charging capacity to the full charging capacity.

Figure 3:
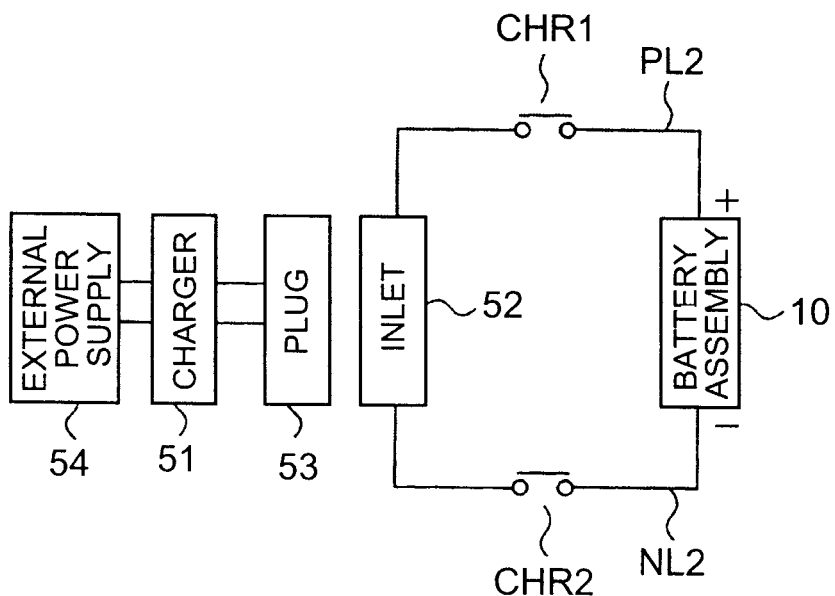
FIG. 3 is a view showing the configuration of a modified example of the external charging system.

The system that performs the external charging operation is not limited to the system as shown in FIG. 2. Namely, the system is only required to supply electric power of the external power supply 54 to the battery assembly 10. Thus, a modified example of the configuration of the external charging system is illustrated in FIG. 3. The system as shown in FIG. 3 may be used in place of the system as shown in FIG. 2. In FIG. 3, the same reference numerals are used for identifying members or components having the same functions as those explained above with reference to FIG. 2.

The inlet 52 is connected to the battery assembly 10, via the positive line PL2 and the negative line NL2. In this example, the inlet 52 is installed on the vehicle. The plug 53 to be connected to the inlet 52 is located outside the vehicle, and is connected to the charger 51 at a location outside the vehicle. The charger 51 converts AC power supplied from the external power supply 54, to DC power. When the plug 53 is connected to the inlet 52, the DC power from the charger 51 is supplied to the battery assembly 10. In this manner, the battery assembly 10 can be charged.

In the system as shown in FIG. 3, the controller 40 communicates with the charger 51, so as to cause the charger 51 to start an external charging operation, or stop the external charging operation. The communications between the controller 50 and the charger 51 may be wireless communications or wire or cable communications. The power of the external power supply 54 may be supplied via a cable to the battery assembly 10, or may be wirelessly supplied to the battery assembly 10. Namely, a so-called contactless charging method, which utilizes electromagnetic induction or resonance phenomenon, may be employed.

Figure 4:
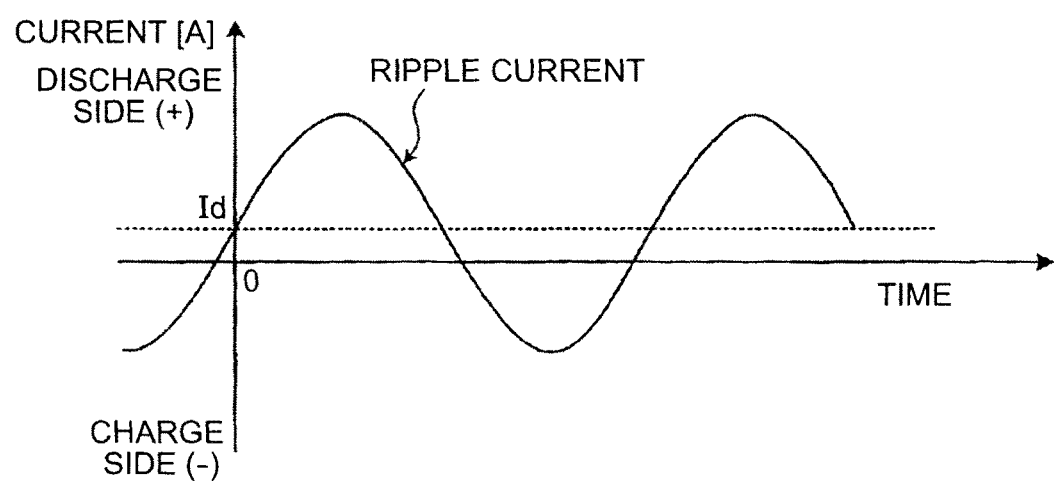
FIG. 4 is a view showing ripple current passed through the battery assembly shown in FIG. 1.

Next, an operation (temperature elevating operation) to warm up the battery assembly 10 (cell) will be explained with reference to FIG. 4. In FIG. 4, the vertical axis indicates current value, and the horizontal axis indicates time.

If ripple current as shown in FIG. 4 is passed through the battery assembly 10 (cell), the battery assembly 10 (cell) generates heat, due to the internal resistance of the battery assembly 10 (cell). The temperature of the battery assembly 10 (cell) can be increased by using the heat thus generated.

More specifically, in a condition where the battery assembly 10 and the boost circuit 33 are connected to each other, the controller 40 periodically switches the transistors 33d, 33e of the boost circuit 33 between ON and OFF. By periodically switching the transistors 33d, 33e between ON and OFF, it is possible to periodically switch the battery assembly 10 between a charged state and a discharging state.

In the above manner, the current value can be changed to the discharge side (the positive side) and the charge side (the negative side), with reference to a given value (a positive value) Id [A]. Thus, ripple current as a frequency signal whose amplitude is centered at the given value Id [A] can be generated. The frequency of the ripple current can be changed by changing the periods of time for which the transistors 33d, 33e are placed in the ON or OFF state. The center of the amplitude of the ripple current may be shifted to the positive side or negative side, relative to the given value Id [A].

The amount of heat generated by the battery assembly 10 (cell) is expressed by the following equation (1).

$$Q = I^2 \times R \tag{1}$$

In the above equation (1), Q is the amount of heat generated by the battery assembly 10 (cell), and I is (a) value of current flowing through the battery assembly 10 (cell), while R is the internal resistance of the battery assembly 10 (cell).

As the current value I or the internal resistance R increases, the amount of heat generation Q increases, as indicated in the above equation (1). In particular, since the amount of heat generation Q is proportional to the square of the current value I, the amount of heat generation Q can be easily increased by increasing the current value I. Thus, if the amplitude of the ripple current as shown in FIG. 4 is increased, the effective current value of the ripple current can be increased, and the amount of heat generation Q can be easily increased.

Figure 5:
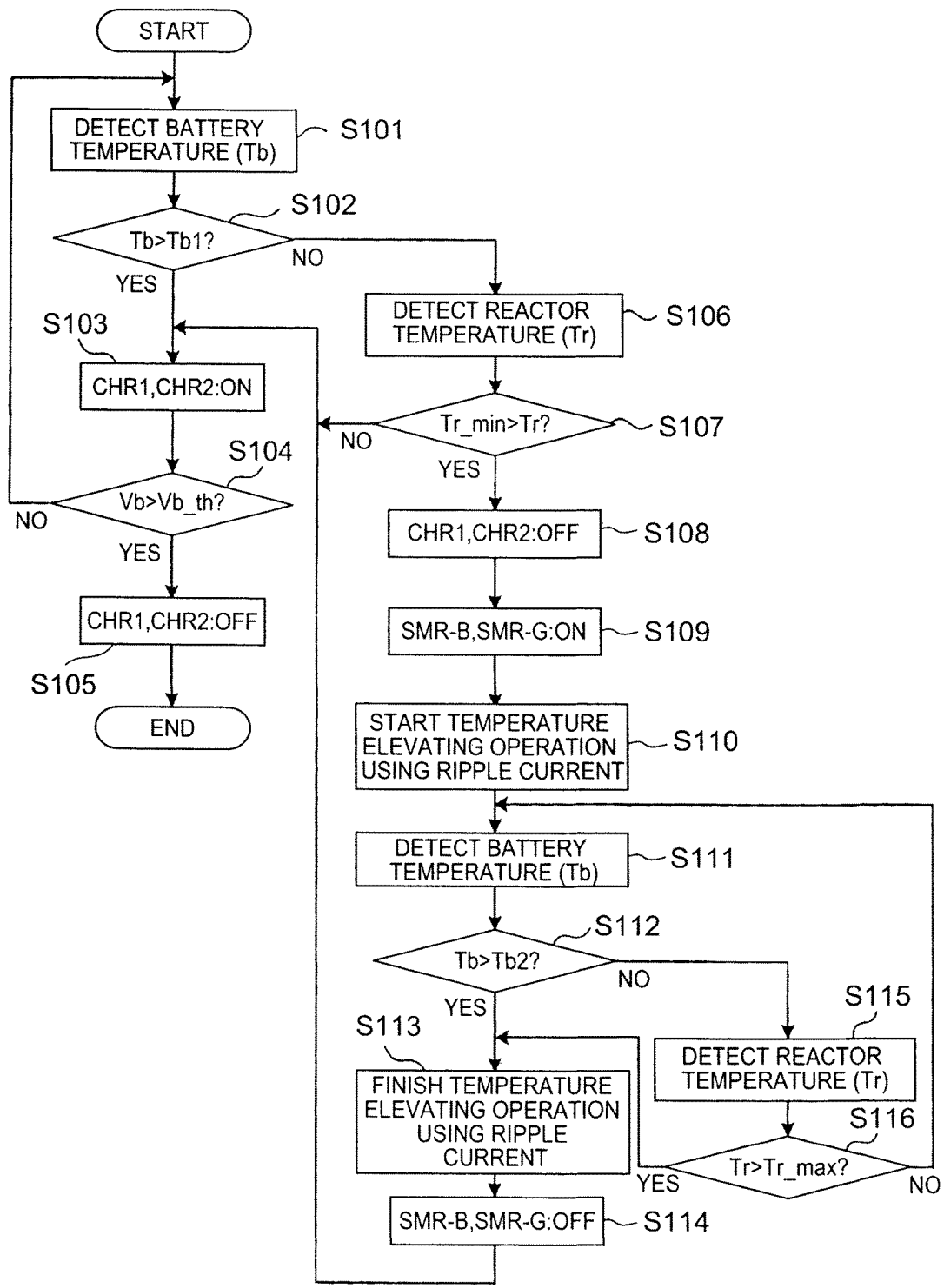
FIG. 5 is a flowchart illustrating a temperature elevating operation and an external charging operation performed by the battery system.

Next, operations performed when external charging is conducted will be explained using the flowchart illustrated in FIG. 5. In this embodiment, an operation to warm up the battery assembly 10 is performed as needed, when an external charging operation is performed. A control routine shown in FIG. 5 is executed by the controller 40. Also, the control routine of FIG. 5 may be started when the plug 53 is connected to the inlet 52.

In step S101, the controller 40 detects the temperature Tb of the battery assembly 10, based on the output of the temperature sensor 30. In step S102, the controller 40 determines whether the battery temperature Tb detected in step S101 is higher than a first threshold value Tb1. The first threshold value Tb1 is determined in advance, based on a viewpoint as to whether the battery assembly 10 can receive and generate a sufficient amount of power.

As described above, if the temperature of the battery assembly 10 (cell) is reduced, the internal resistance of the battery assembly 10 (cell) increases, and the battery assembly 10 is less likely to receive and generate a sufficient amount of power. If the battery assembly 10 (cell) is warmed up, the internal resistance of the battery assembly 10 (cell) is reduced, and the battery assembly 10 is more likely to receive and generate a sufficient amount of power. In this embodiment, the first threshold value Tb is provided for determining whether the battery assembly 10 needs to be warmed up. The information concerning the first threshold value Tb1 may be stored in the memory 41.

When the battery temperature Tb is higher than the first threshold value Tb1, the controller 40 determines that there is no need to warm up the battery assembly 10, and proceeds to step S103. On the other hand, if the battery temperature Tb is lower than the first threshold value Tb1, the controller 40 determines that the battery assembly 10 needs to be warmed up, and proceeds to step S106.

In step S103, the controller 40 switches the charging relays CHR1, CHR2 from OFF to ON. As a result, electric power is supplied from the external power supply 54 to the battery assembly 10, so as to charge the battery assembly 10. As the external charging operation proceeds, the SOC (voltage) of the battery assembly 10 can be increased. When switching the charging relays CHR1, CHR2 to ON, the controller 40 places the system main relays SMR-B, SMR-G, SMR-P in the OFF states.

In step S104, the controller 40 detects the voltage Vb of the battery assembly 10, based on the output of the monitoring unit 20. Then, the controller 40 determines whether the battery voltage Vb is higher than a threshold value Vb_th. The threshold value Vb_th, which may be set as appropriate, is a voltage value of the battery assembly 10 when the external charging operation is to be completed. Generally, when an external charging operation is performed, the battery assembly 10 can be charged until the battery assembly 10 comes into a fully charged state. In this case, the threshold value Vb_th may be set to the voltage value of the battery assembly 10 that is in the fully charged state.

When the battery voltage Vb is higher than the threshold value Vb_th, the controller 40 determines that the external charging operation is completed, and proceeds to step S105. When the battery voltage Vb is lower than the threshold value Vb_th, on the other hand, the controller 40 determines that the external charging operation has not been completed, and returns to step S101.

While the voltage Vb of the battery assembly 10 is detected in this embodiment, the invention is not limited to this. Namely, the voltage of each of the cells that constitute the battery assembly 10 may be detected. Then, it may be determined whether the external charging operation is completed, based on the voltage of the cells.

In step S105, the controller 40 switches the charging relays CHR1, CHR2 from ON to OFF. As a result, the power from the external power supply 54 ceases to be supplied to the battery assembly 10, and the external charging operation can be finished.

On the other hand, when the controller 40 proceeds from step S102 to step S106, the controller 40 detects the temperature Tr of the reactor 33a, based on the output of the temperature sensor 34. In step S107, the controller 40 determines whether the reactor temperature Tr detected in step S106 is lower than a lower-limit temperature Tr_min.

The lower-limit temperature Tr_min is used for determining reduction of the temperature of the reactor 33a, and may be set as appropriate. The information concerning the lower-limit temperature Tr_min may be stored in the memory 41.

If no current passes through the reactor 33a, the temperature of the reactor 33a will be reduced. The lower-limit temperature Tr_min may be set to a temperature level to which the temperature of the reactor 33a is reduced, immediately before the temperature of the reactor 33a becomes unlikely to change. Namely, the lower-limit temperature Tr_min may be set to a temperature level at which the rate of reduction of the temperature of the reactor 33a becomes equal to or smaller than a threshold value. Since the temperature of the reactor 33a that is in a non-energized condition depends on an ambient temperature measured around the reactor 33a, the lower-limit temperature Tr_min may be set to the ambient temperature.

In this embodiment, when the reactor temperature Tr reaches the lower-limit temperature Tr_min, the controller 40 switches from the external charging operation to a temperature elevating operation, as will be described later. Where the lower-limit temperature Tr_min is set as described above, the temperature elevating operation can be resumed from a condition where the reactor temperature Tr is reduced to the minimum. Thus, the temperature elevating operation is more likely to be performed for a sufficient period of time, assuring high efficiency.

When the reactor temperature Tr is lower than the lower-limit temperature Tr_min, the controller 40 proceeds to step S108. When the reactor temperature Tr is higher than the lower-limit temperature Tr_min, on the other hand, the controller 40 proceeds to step S103, and performs an external charging operation.

In step S108, the controller 40 switches the charging relays CHR1, CHR2 from ON to OFF. As a result, no external charging operation will be performed. In step S109, the controller 40 switches the system main relays SMR-B, SMR-G from OFF to ON.

The switching operation is carried out in the following manner. Namely, the controller 40 switches the system main relay SMR-P from OFF to ON, and then switches the system main relay SMR-G from OFF to ON. Then, the controller 40 switches the system main relay SMR-P from ON to OFF, after switching the system main relay SMR-G to ON. In this manner, the battery assembly 10 can be connected to the boost circuit 33.

In step S110, the controller 40 periodically switches the transistors 33d, 33e of the boost circuit 33 between ON and OFF, so as to produce ripple current. By passing the ripple current through the battery assembly 10, it is possible to cause the battery assembly 10 to generate heat, and increase the temperature of the battery assembly 10.

In step S111, the controller 40 detects the temperature Tb of the battery assembly 10, based on the output of the temperature sensor 30. In step S112, the controller 40 determines whether the battery temperature Tb detected in step S111 is higher than a second threshold value Tb2. The second threshold value Tb2 is a temperature higher than the first threshold value Tb1, and may be set as appropriate. The information concerning the second threshold value Tb2 is stored in the memory 41.

The second threshold value Tb2 is set to an appropriate value so that the temperature Tb of the battery assembly 10 is kept higher than the first threshold value Tb1. If the operation to elevate the temperature of the battery assembly 10 using ripple current is stopped when the temperature of the battery assembly 10 reaches the first threshold value Tb1, the temperature Tb of the battery assembly 10 may be reduced to be lower than the first threshold value Tb1.

Thus, in this embodiment, the second threshold value Tb2 that is higher than the first threshold value Tb1 is set, and the temperature Tb of the battery assembly 10 is increased up to the second threshold value Tb2. Thus, even if the operation to elevate the temperature of the battery assembly 10 using ripple current is stopped, after the temperature Tb of the battery assembly 10 reaches the second threshold value Tb2, the temperature Tb of the battery assembly 10 is less likely or unlikely to be reduced to be lower than the first threshold value Tb1.

When the battery temperature Tb is higher than the second threshold value Tb2, the controller 40 determines that the battery assembly 10 has been warmed up, and proceeds to step S113. When the battery temperature Tb is lower than the second threshold value Tb2, on the other hand, the controller 40 determines that the battery assembly 10 has not been sufficiently warmed up, and proceeds to step S115.

In step S113, the controller 40 finishes the operation to elevate the temperature of the battery assembly 10 using ripple current. More specifically, the controller 40 stops driving the transistors 33d, 33e in the boost circuit 33.

In step S114, the controller 40 switches the system main relays SMR-B, SMR-G from ON to OFF. As a result, the battery assembly 10 and the boost circuit 33 can be disconnected from each other. After executing step S113, the controller 40 proceeds to step S103, to perform external charging.

When the controller 40 proceeds from step S112 to step S115, the controller 40 detects the temperature of the reactor 33a, based on the output of the temperature sensor 34. In step S116, the controller 40 determines whether the reactor temperature Tr is higher than an upper-limit temperature Tr_max.

The upper-limit temperature Tr_max is set so as to curb excessive heating of the reactor 33a, and protect the reactor 33a. When the temperature elevating operation is performed, ripple current flows through the reactor 33a, so that the reactor 33a generates heat. If the current continues to be passed through the reactor 33a, the reactor temperature Tr keeps increasing, and may become higher than the heatproof temperature (i.e., upper temperature limit) of the reactor 33a.

Thus, the upper-limit temperature Tr_max may be set as appropriate, based on the heatproof temperature of the reactor 33a, and the information concerning the upper-limit temperature Tr_max may be stored in the memory 41.

When the reactor temperature Tr is higher than the upper-limit temperature Tr_max, the controller 40 determines that heating of the reactor 33a needs to be curbed, and proceeds to step S113. If the controller 40 proceeds to step S113, no ripple current will be generated, and no current will flow through the reactor 33a.

If no current flows through the reactor 33a, heating of the reactor 33a with current passed threrethrough can be stopped, and heat can be released from the reactor 33a. As a result, the reactor temperature Tr is reduced, so that excessive heating of the reactor 33a is curbed, and the reactor 33a can be protected.

When the reactor temperature Tr is lower than the upper-limit temperature Tr_max, the controller 40 determines that current can be caused to keep flowing through the reactor 33a, and returns to step S111. Namely, the temperature elevating operation using ripple current can be continued until the reactor temperature Tr reaches the upper-limit temperature Tr_max.

Figure 6:
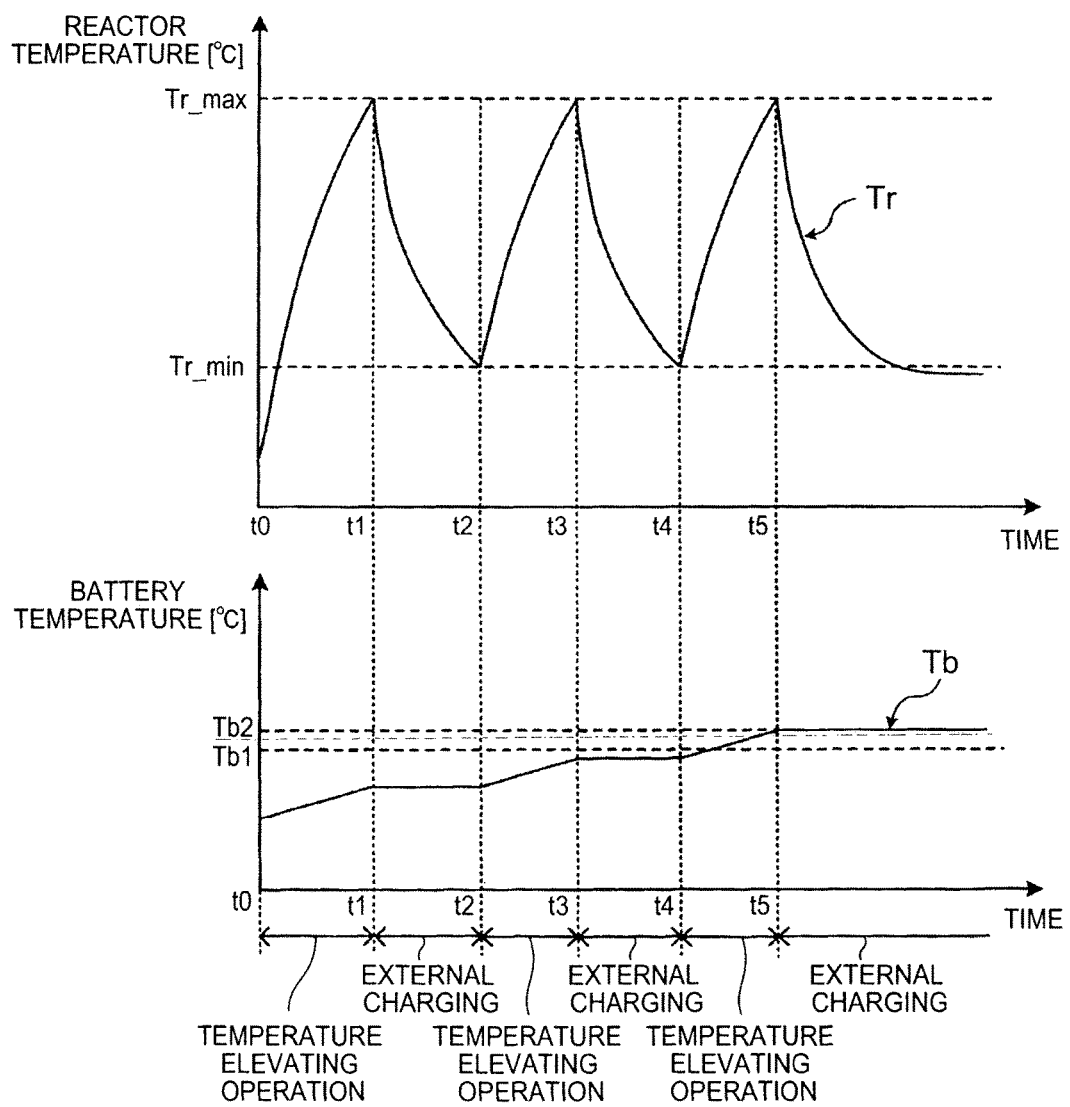
FIG. 6 is a view showing the behaviors of temperatures of a reactor and the battery assembly in the battery system.

FIG. 6 shows the behaviors (one example) of the reactor temperature Tr and the battery temperature Tb when the control routine as shown in FIG. 5 is executed.

At time t0, the battery temperature Tb is lower than the first threshold value Tb1, and therefore, the temperature elevating operation using ripple current is performed. If the temperature elevating operation is performed, the battery temperature Tb can be elevated. Also, ripple current flows through the reactor 33a, so that the reactor temperature Tr is also elevated.

In FIG. 6, the reactor temperature Tr becomes higher than the lower-limit temperature Tr_min, between time t0 and time t1, and the reactor temperature Tr reaches the upper-limit temperature Tr_max at time t1. When the reactor temperature Tr reaches the upper-limit temperature Tr_max, the temperature elevating operation is stopped. Then, after the temperature elevating operation is stopped, an external charging operation is performed.

At time t1, the temperature elevating operation is stopped, so that no ripple current flows through the reactor 33a. Thus, after time t1, heat is released from the reactor 33a, and the reactor temperature Tr is reduced. Also, after time t1, the external charging operation is performed, so that the SOC of the battery assembly 10 can be increased.

Since the temperature elevating operation is not performed after time t1, the temperature of the battery assembly 10 is less likely to be increased. However, the external charging operation is performed after time t1, and charging current flows through the battery assembly 10; therefore, the temperature of the battery assembly 10 is prevented from being reduced.

When the reactor temperature Tr reaches the lower-limit temperature Tr_min at time t2, the external charging operation is stopped. If the battery temperature Tb has not reached the second threshold value Tb2 after the external charging operation is stopped, the temperature elevating operation is performed. In FIG. 6, the temperature Tb has not reached the second threshold value Tb2 at time t2, and therefore, the temperature elevating operation is resumed.

When the reactor temperature Tr reaches the lower-limit temperature Tr_min, ripple current can be passed through the reactor 33a. Namely, the temperature of the reactor 33a is allowed to be increased with the current passed therethrough, and the temperature elevating operation can be resumed. The operation between time t2 and time t3 is similar to the operation between time t0 and time t1, and the operation between time t3 and time t4 is similar to the operation between time t1 and time t2.

In FIG. 6, the battery temperature Tb reaches the second threshold value Tb2 at time t5. Thus, the temperature elevating operation using ripple current is finished at time t5, and only the external charging operation is performed after time t5. When the battery voltage Vb reaches the threshold value Vb_th, the external charging operation is also finished.

In this embodiment, if the battery temperature Tb has not reached the second threshold value Tb2, the temperature elevating operation using ripple current may be continued even after the battery voltage Vb reaches the threshold value Vb_th. If the temperature elevating operation is continued, the reactor temperature Tr may reach the upper-limit temperature Tr_max.

In this case, the temperature elevating operation may be once stopped when the reactor temperature Tr reaches the upper-limit temperature Tr_max, so that heat is released from the reactor 33a. Then, after it is confirmed that the reactor temperature Tr is reduced to some extent, the temperature elevating operation may be resumed. For example, the temperature elevating operation may be stopped until the reactor temperature Tr reaches the lower-limit temperature Tr_min, and the temperature elevating operation may be resumed when the reactor temperature Tr reaches the lower-limit temperature Tr_min.

In this embodiment, ripple current is generated using the boost circuit 33, so as to warm up the battery assembly 10 (cell); therefore, there is no need to use a component (such as a heater) dedicated to warming up the battery assembly 10 (cell), and the number of components can be prevented from increasing. Also, in a system having the function of boosting the output voltage of the battery assembly 10, the battery assembly 10 can be warmed up by using an existing component (i.e., the boost circuit 33).

Also, in this embodiment, the temperature elevating temperature can be performed while preventing the reactor temperature Tr from exceeding the upper-limit temperature Tr_th, as described above; therefore, there is no need to increase the heatproof temperature of the reactor 33a.

By increasing the cross-sectional area of a coil wire of the reactor 33a, it is possible to increase the heat capacity of the reactor 33a, and raise the heatproof temperature (or upper temperature limit) of the reactor 33a. However, if the cross-sectional area of the coil wire of the reactor 33a is increased, the size of the reactor 33a will be increased. In this embodiment, there is no need to increase the heatproof temperature of the reactor 33a, and the reactor 33a is prevented from being large-sized.

When ripple current is generated, a power loss occurs due to the resistance in a current path (e.g., reactor 33a) through which the ripple current flows. Namely, the SOC (voltage) of the battery assembly 10 may be reduced due to generation of the ripple current.

In this embodiment, the temperature elevating operation is performed when the external charging operation is performed; therefore, it is possible to compensate for the power loss that occurs when the ripple current is generated, by using electric power supplied from the external power supply 54. Accordingly, even if the ripple current is generated, the SOC (voltage) of the battery assembly 10 will not be reduced. If the SOC of the battery assembly 10 is prevented from being reduced, the running distance over which the vehicle runs using the output of the battery assembly 10 can be prevented from being reduced.

Also, in this embodiment, the temperature elevating operation and the external charging operation are performed at mutually different times, and the temperature elevating operation and the external charging operation are inhibited from being performed at the same time. In other words, the charging relays CHR1, CHR 2 are in the OFF states when the system main relays SMR-B, SMR-G are ON, and the system main relays SMR-B, SMR-G are in the OFF states when the charging relays CHR1, CHR2 are ON.

With the above arrangement, the ripple current generated when the temperature elevating operation is performed can be prevented from flowing to the external power supply 54 side, and current noise caused by the ripple current can be prevented from occurring at the external power supply 54 side.

While the controller 40 switches from the external charging operation to the temperature elevating operation when the reactor temperature Tr reaches the lower-limit temperature Tr_min in this embodiment, the invention is not limited to this arrangement. Namely, the controller 40 may switch from the external charging operation to the temperature elevating operation before the reactor temperature Tr reaches the lower-limit temperature Tr_min. Since the reactor temperature Tr is reduced after the temperature elevating operation is stopped, the controller 40 may switch from the external charging operation to the temperature elevating operation when a predetermined period of time elapses from the time when the temperature elevating operation is stopped, for example.

While the controller 40 switches from the temperature elevating operation to the external charging operation when the reactor temperature Tr reaches the upper-limit temperature Tr_max in this embodiment, the invention is not limited to this arrangement. Namely, the controller 40 may switch from the temperature elevating operation to the external charging operation, before the reactor temperature Tr reaches the upper-limit temperature Tr_max.

Since the reactor temperature Tr increases if ripple current flows through the reactor 33a via the temperature elevating operation, the controller 40 may switch from the temperature elevating operation to the external charging operation when a predetermined period of time elapses from the time when the temperature elevating operation is started, for example. Here, the predetermined period of time may be set to a shorter period of time than the time it takes for the reactor temperature Tr to reach the upper-limit temperature Tr_max. In this case, too, the controller 40 can perform the temperature elevating operation while curbing excessive heating of the reactor 33a.

As described above, the temperature elevating operation and the external charging operation may be alternately performed, irrespective of the relationship between the reactor temperature Tr and the temperatures Tr_max, Tr_min. In this case, too, substantially the same effect as that of this embodiment may be obtained.

What is claimed is:

1. A power storage system comprising:
   a power storage device configured to be charged and discharged;
   a boost circuit including a reactor and switching devices, the boost circuit being configured to boost an output voltage of the power storage device when the switching devices are driven;
   a first temperature sensor configured to detect a temperature of the reactor; and
   a controller programmed to:
      control driving of the switching devices, the controller being programmed to alternately perform: (i) a charging operation; and (ii) a temperature elevating operation,
         the charging operation supplying electric power from an external power supply to the power storage device, and
         the temperature elevating operation causing a temperature of the power storage device to elevate by using ripple current generated when the switching devices are driven; and
      switch from the charging operation to the temperature elevating operation, when the temperature of the reactor detected by the first temperature sensor becomes lower than a lower-limit temperature.

2. The power storage system according to claim 1, wherein the controller is further programmed to switch from the temperature elevating operation to the charging operation, when the temperature of the reactor detected by the first temperature sensor becomes higher than an upper-limit temperature.

3. The power storage system according to claim 2, wherein
the upper-limit temperature is determined based on a heatproof temperature of the reactor.

4. The power storage system according to claim 1, wherein
the controller is further programmed to switch from the temperature elevating operation to the charging operation, when a predetermined period of time elapses from a time when the temperature elevating operation is started.

5. The power storage system according to claim 1, wherein
the lower-limit temperature is set to a temperature at which a rate of reduction of the temperature of the reactor after the temperature elevating operation is stopped becomes equal to or smaller than a threshold value.

6. The power storage system according to claim 1, wherein
the lower-limit temperature is an ambient temperature measured around the reactor.

7. The power storage system according to claim 1, wherein
the controller is further programmed to switch from the charging operation to the temperature elevating operation, when a predetermined period of time elapses from a time when the temperature elevating operation is stopped.

8. The power storage system according to claim 1, further comprising:
a second temperature sensor configured to detect a temperature of the power storage device, wherein
the controller is further programmed to alternately perform the charging operation and the temperature elevating operation, until the temperature of the power storage device detected by the second temperature sensor reaches a predetermined temperature.

9. The power storage system according to claim 8, wherein
the controller is further programmed to continue the charging operation without performing the temperature elevating operation, when the temperature of the power storage device becomes higher than the predetermined temperature.

10. The power storage system according to claim 1, wherein
the power storage device is configured to generate electric energy that is to be converted into kinetic energy for running a vehicle.

11. A temperature control method for a power storage system, the power storage system including a power storage device configured to be charged and discharged, and a boost circuit including a reactor and switching devices, the boost circuit being configured to boost an output voltage of the power storage device when the switching devices are driven, a first temperature sensor configured to detect a temperature of the reactor, a controller programmed to execute steps of the temperature control method, the temperature control method comprising:
executing, by the controller, a charging operation to supply electric power from an external power supply to the power storage device;
executing, by the controller, a temperature elevating operation to produce ripple current by driving the switching devices, and to cause a temperature of the power storage device to elevate by using the ripple current;
alternately executing, by the controller, the charging operation and the temperature elevating operation; and
switching, by the controller, from the charging operation to the temperature elevating operation, when the temperature of the reactor detected by the first temperature sensor becomes lower than a lower-limit temperature.

* * * * *